United States Patent [19]
Goroshkov et al.

[11] 3,781,568
[45] Dec. 25, 1973

[54] COHERENT ANALYZER OF FREQUENCY-PHASE SPECTRUM OF ELECTRIC SIGNALS

[76] Inventors: Boris Ivanovich Goroshkov, ulitsa Metallurgov, 13, korpus 2, kv. 20; Nikolai Ivanovich Kovshov, ulitsa Utkina, 45, kv. 54, both of Moscow, U.S.S.R.

[22] Filed: July 15, 1971

[21] Appl. No.: 162,794

[52] U.S. Cl. ............... 307/232, 307/233, 307/235, 328/139, 328/140
[51] Int. Cl. .................................................. H03d 13/00
[58] Field of Search .................. 307/232, 235, 233; 328/109, 110, 115–117, 135, 139, 140

[56] References Cited
UNITED STATES PATENTS

| | | | |
|---|---|---|---|
| 2,804,606 | 8/1957 | Reaves | 328/115 X |
| 2,927,207 | 3/1960 | Fiehrer et al. | 328/116 |
| 3,228,002 | 1/1966 | Reines | 307/235 |
| 3,230,462 | 1/1966 | Kohl | 328/116 X |

*Primary Examiner*—John Zazworsky
*Attorney*—Eric H. Waters et al.

[57] ABSTRACT

The coherent analyzer of phase-frequency spectrum of electric signals comprises an oscillator electrically connected to a first input of a first electronic gate whose second input is supplied with signals being investigated. The output of the first gate is connected to a first integrating network. The coherent analyzer is further provided with a phase distributor connected to the oscillator output and a group of gates, consisting of at least two gates, the first inputs of which are connected, together with the input of the first gate, to the outputs of the phase distributor. The second inputs of the gates of said group are supplied with electric signals being investigated, and the outputs of these gates are connected to integrating networks of a group of integrating networks whose number equals to the number of these gates connected to an amplitude analyzer. The amplitude analyzer is in turn connected to the output of the first integrating network and to the outputs of the integrating networks of said group, and is so designed that one of the outputs of the coherent analyzer only shows the maximum electrical signal among the signals arriving from all the integrating networks, and the other output shows a signal corresponding to the phase of the signal being investigated.

3 Claims, 4 Drawing Figures

COHERENT ANALYZER OF FREQUENCY-PHASE SPECTRUM OF ELECTRIC SIGNALS

The present invention relates to devices for investigating electric signals, and more particularly, to coherent analyzers of the phase-frequency spectrum of electric signals.

Known in the art is a coherent analyzer of the phase-frequency spectrum of electric signals, comprising an oscillator electrically coupled to a first input of a gate, a second input of which is connected to the source of signals being investigated and the output, to an integrating circuit.

In the prior art analyzers the oscillator signal is compared with the signals being investigated. The two signals are mixed and the resultant signal is applied to integrating R–C networks. The D.C. component developed at the output of an R.C. network is a measure of the amplitude of that frequency component in the signal being investigated to which the oscillator is tuned. A disadvantage of such analyzers is that the magnitude of the D.C. component depends on the phase of the two mixed signals.

The known analyzers employing L-C and R-C networks are used at relatively high frequencies. The use of such analyzers at low and infra-low frequencies necessitates that their design be extremely complicated. A further disadvantage of such analyzers is that at such frequencies the quality of the frequency response characteristics measured by them is not sufficiently high.

The object of the present invention lies in avoiding these disadvantages by providing a coherent analyzer of the phase-frequency spectrum of electric signals wherein the use of a multi-phase signal distribution circuit enables the obtaining of an amplitude-vs.-frequency characteristic and a phase-vs.-frequency characteristic of the signal being investigated.

The object of the present invention is attained in that the coherent analyzer of the phase-frequency spectrum, comprising an oscillator electrically connected to a first input of a first gate whose second input is supplied with a signal being investigated and the output of the first gate is connected to a first integrating network, in accordance with the present invention, is provided with a phase distributor connected to the oscillator output and at least two gates whose first inputs, together with the first input of the first gate, are connected to the outputs of the phase distributor, the second inputs of the group of gates being supplied with signals being investigated, and it also has integrating networks corresponding in number to the number of gates and connected to the outputs of the gates, and an amplitude analyzer connected to the outputs of the first integrating network and of the group of integrating networks, the amplitude analyzer being so designed that one of the outputs of the coherent analyzer shows only the maximum signal among the signals arriving from all the integrating networks and the other output shows a signal corresponding to the phase of the signal being investigated.

The pulse-height analyzer utilized in the coherent analyzer of the phase-frequency spectrum of electric signals preferably employs transistors which are equal in number to the number of all integrating networks, the transistors having bases which are connected to the outputs of the integrating circuits and the transistor emitters, to a common resistor and to a phase summator, whose outputs are connected to the transistor collectors.

It is also preferable that each transistor of the pulse-height analyzer in the coherent analyzer of the phase-frequency spectrum is provided with an individual resistor which is connected between the emitter of the transistor and the common resistor.

The invention makes it possible to simultaneously measure amplitude-vs.frequency characteristic $x = f(w)$ and a phase-vs.-frequency characteristic $\phi = f(w)$ of the signals being investigated and provides better frequency response in the region of infra-low frequencies as compared to prior art analyzers. The invention also enables the physical dimensions and weight of the instrument to be reduced.

The invention will be best understood from the following description of a specific embodiment when read in connection with the accompanying drawings in which.

Figure 1:
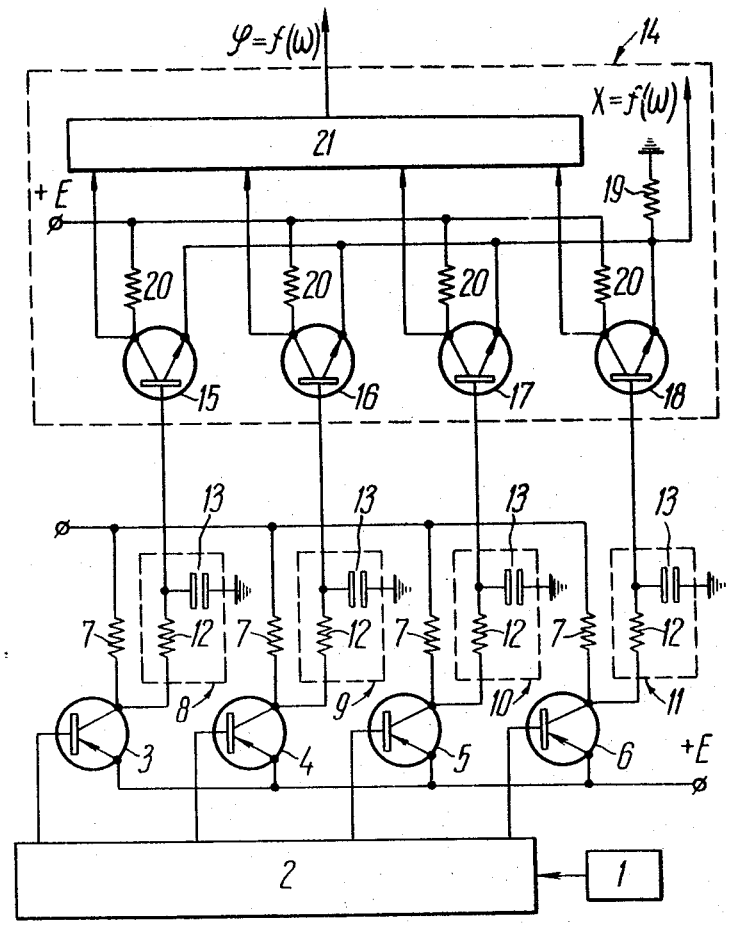
FIG. 1 is a schematic diagram of a coherent analyzer of the phase-frequency spectrum of electric signals, according to the invention.

The coherent analyzer of the phase-frequency spectrum of electric signals according to the invention comprises an oscillator 1 (FIG. 1) which is connected to the input of a phase distributor 2. The outputs of the phase distributor 2 are connected to the inputs of gates 3, 4, 5, 6 which, in the present embodiment, employ transistors. The emitters of the transistors 3, 4, 5, 6 are connected together and to the positive terminal of the power supply. Resistors 7 of equal value are connected to the collectors of the transistors 3, 4, 5, 6. The other ends of the resistors 7 are supplied with signals being investigated.

Additionally, the collectors of the transistors 3, 4, 5, 6 are connected to integrating networks 8, 9, 10, 11. Each integrating networks is made up of a resistor 12 and a capacitor 13. The outputs of the integrating networks 8, 9, 10, 11 are connected to the inputs of a pulse-height analyzer 14 which is designed so that only a maximum electric signal from among the signals emitted from all integrating networks 8, 9, 10, 11 appears at one output of the coherent analyzer and an electric signal corresponding to the phase of the signal being investigated appears at the other output.

In order to obtain a better accuracy in measuring the amplitude-vs.-frequency and phase-vs.-frequency characteristics of the signal the coherent analyzer should be preferably designed with 16, 32 or more outputs (phase channels) of the phase distributor 2.

The pulse-height analyzer 14 shown in FIG. 1 comprises transistors 15, 16, 17, 18, having bases which are connected to the outputs of the integrating networks 8, 9, 10, 11. The emitters of the transistors 15, 16, 17, 18 are connected together and to a common resistor 19, the other end of which is connected to the zero potential terminal of the power supply. A resistor 20 is connected to the collector of each of the transistors 15, 16, 17, 18. The other ends of the resistors 20 are taken to a positive terminal of the power supply. Furthermore, the collectors of the transistors 15, 16, 17, 18 are connected to the inputs of a phase summator 21 at the output of which the phase-vs.-frequency characteristic $\phi = f(w)$ of the signal being investigated is measured. The amplitude-vs.-frequency characteristic $x = f(w)$ of the signal is measured across the resistor 19.

To improve the accuracy of measurement of the phase-vs.-frequency characteristic $\phi = f(w)$ of the signal being investigated with the given number of the phase channels an individual resistor 22 is preferably connected between the common resistor 19 (FIG. 2) and the emitter of each of the transistors 15, 16, 17, 18.

The pulse-height analyzer 14 may also employ a transformer arrangement, the number of the transformer windings being determined by the number of the phase channels of the phase distributor.

Figure 3:
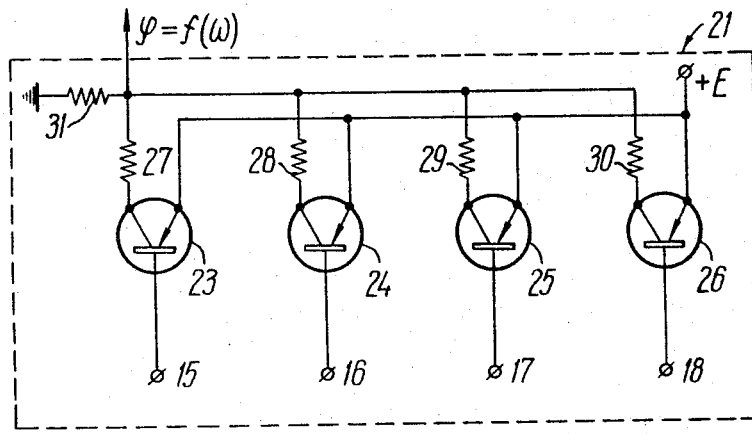
FIG. 3 is a schematic diagram of a phase summator utilized in the coherent analyzer described herein.
Figure 4:
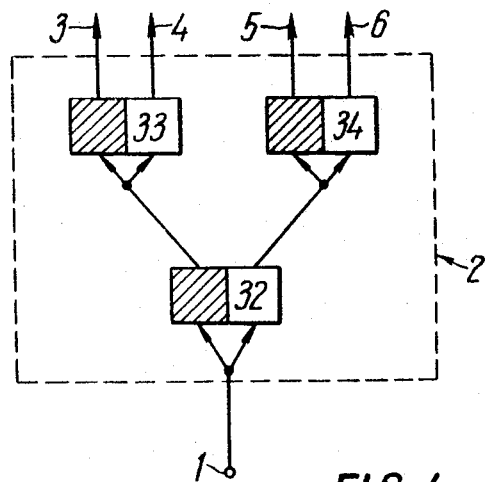
FIG. 4 is a functional diagram of a phase distributor utilized in the coherent analyzer as described herein.

The embodiments of the pulse-height analyzer 14 described above should be preferably used with the phase summator 21 (FIG. 3). The phase summator 21 employs transistors 23, 24, 25, 26, the number of which is equal to the number of the phase channels in the phase distributor 2 (FIG. 1). The bases of the transistors 23, 24, 25, 26 (FIG. 3) are connected to the collectors of the transistors 15, 16, 17, 18, respectively. The emitters of the transistors 23, 24, 25, 26 are connected together and to the positive terminal of the power supply. The collector circuits of the transistors 23, 24, 25, 26 contain resistors 27, 28, 29, 30 which have the ratings R, 2R, 3R, 4R, respectively. The other ends of the resistors 27, 28, 29, 30 are connected together and to a resistor 31 across which the phase-vs.-frequency characteristic $\phi = f(w)$ of the signal being investigated is measured. In order to obtain four phase channels in the present embodiment of the coherent analyzer, the phase distributor 2 should preferably employ flip-flops whose connection is shown in the functional diagram in FIG. 4. The counting input of a flip-flop 32 is connected to the oscillator 1. Two outputs of the flip-flop 32 control operation of flip-flops 33 and 34. The outputs of the flip-flops 33 and 34 are, in their turn, connected to the bases of the transistors 3, 4, 5, 6.

The coherent analyzer of the phase-frequency spectrum of electric signals as described herein depends for its operation on a comparison of the frequency of the oscillator 1 (FIG. 1) with the frequency of the signal being investigated fed being to the input of the coherent analyzer.

The signal being investigated is applied to the resistors 7 from which it is directed to the collectors of the transistors 3, 4, 5, 6.

Figure 5:
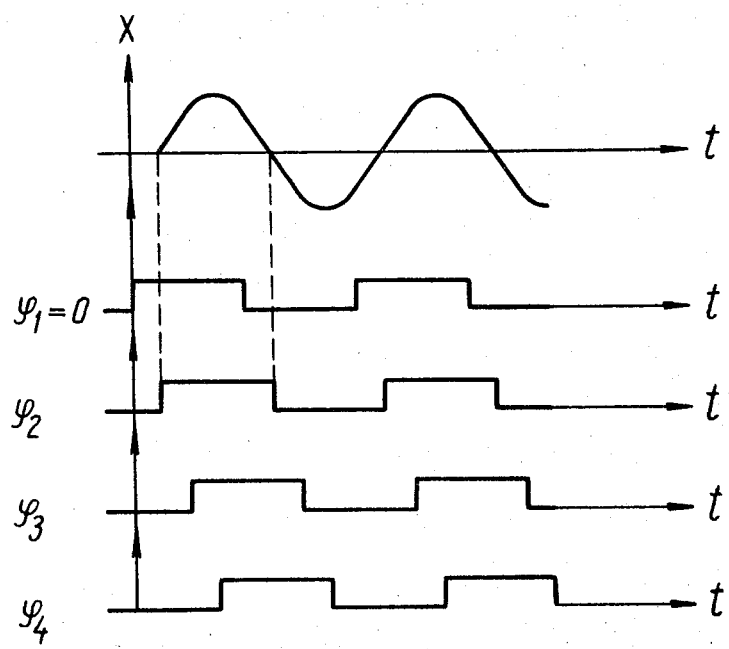

At the same time the oscillator 1 furnishes a signal to the phase distributor 2 causing the phase distributor 2 to produce output signals having different phases $\phi_1$, $\phi_2$, $\phi_3$, $\phi_4$ (FIG. 5). The signal being investigated is mixed with the output signals of the phase distributor 2 (FIG. 1) at the collectors of the transistors 3, 4, 5, 6 and the resultant signals are applied to the integrating networks 8, 9, 10, 11.

At any instant of time one of the phases $\phi_1$, $\phi_2$, $\phi_3$, $\phi_4$, as illustrated by $\phi_2$ (FIG. 5), of the signal furnished by the phase distributor 2 (FIG. 1) will coincide with the phase of the signal being investigated, as shown in FIG. 5 where time (t) is plotted along the X-axis and the signal amplitude (x) along the Y-axis. At that instant of time a maximum D.C. component of the signal will appear at the output of one of the integrating networks.

The maximum D.C. component of the signal renders one of the transistors 15, 16, 17, 18, in effect, the transistor 16, conductive and flows through this transistor and the resistors 19 to the output of the coherent analyzer. The magnitude of this D.C. component of the signal is a measure of the amplitude value of the signal being investigated. Additionally, the maximum D.C. component of the signal will pass to the collector of the conducting transistor 16 and from there to the phase summator 21 which performs a discrete-to-analogue conversion of its phase. The magnitude of the signal at the output of the phase summator 21 corresponds to the phase of the signal being investigated.

Figure 2:
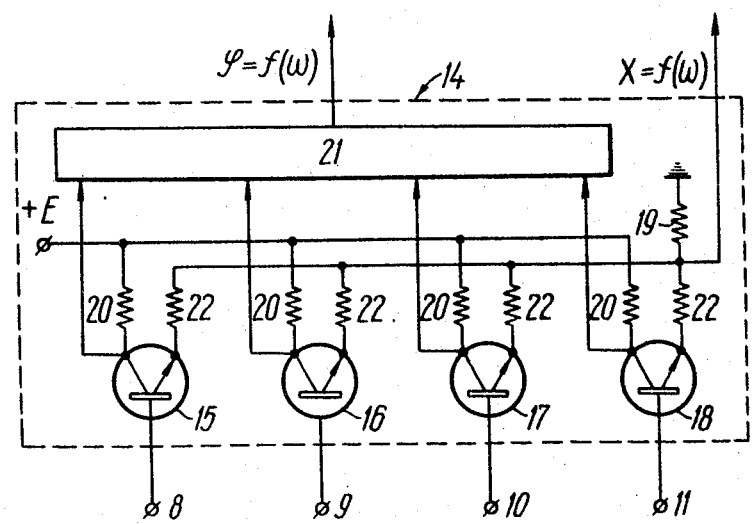
FIG. 2 is a schematic diagram of a pulse-height analyzer utilized in the coherent analyzer of the phase-frequency spectrum of electric signals as described herein.

The coherent analyzer of the phase-frequency spectrum of electric signals with a pulse-height analyzer, shown in FIG. 2, operates in the same manner as the coherent analyzer described above, except that a resistor 22 is connected in the emitter circuit of transistors 15, 16, 17, 18 for improving the accuracy of measurement of the phase-vs.-frequency characteristics $\phi = f(w)$ of the signals being investigated. This somewhat changes operation of the coherent analyzer.

The maximum D.C. component of the signal emitted from one of the integrating networks 8, 9, 10, 11 is applied to the base of one of the transistors 15, 16, 17, 18. This maximum D.C. component of the signal fails to completely cut off the other transistors, which fact distinguishes the operation of the pulse-height analyzer from that of the pulse-height analyzer 14 shown in FIG. 1. The pulse height analyzer 14 (FIG. 2) may be in a condition in which, apart from one fully conducting transistor, the base of which is fed with the maximum D.C. component of the signal, two more of its transistors are conducting as their bases are fed with D.C. components of two signals with phases adjacent to the phase of the maximum D.C. component of the signal. This condition is unstable. Only two transistors may conduct at any one time and the magnitude of the signals at the outputs of these transistors may be used to find the intermediate phase values of the signal being investigated. This makes it possible to pass from an abrupt variation of the phase-vs.-frequency characteristic $\phi = f(w)$ to a smooth variation, which is an advantage of the present pulse-height analyzer.

It is particularly emphasized that the coherent analyzer described herein is unique in that it offers the means for measuring the phase-vs.-frequency characteristic $\phi = f(w)$ of the signal being investigated along with its amplitude-vs.-frequency characteristic $x = f(w)$. Moreover, the coherent analyzer enables investigation of signals in the region of infra-low frequencies, thus considerably extending the field of application of such analyzers.

What is claimed is:

1. A coherent analyzer of the phase-frequency spectrum of electric signals, comprising an oscillator; a first gate having a first input being electrically connected to said oscillator, a second input of said gate being supplied with a signal being investigated; a first integrating circuit connected to the first input of said first gate; a phase distributor connected to the output of said oscillator; a group of gates, consisting of at least two gates, said gates being first inputs connected to the outputs of said phase distributor, the first input of the first gate being also connected to the output of said phase distributor, said gates having second inputs supplied with a signal being investigated; a group of integrating networks, the number of which equals to the number of said gates of said group of gates, said networks being connected to the outputs of said gates; and amplitude analyzer connected to the output of said first integrating circuit and to the outputs of said integrating networks of said group of integrating networks, said amplitude analyzer being adapted so that upon one of the outputs of the coherent analyzer showing only the maximum electric signal among the signals arriving from said first integrating network and said group of integrating networks, the other output shows an electric signal corresponding to the phase of the signal being investigated, and means to supply electrical power to said first gate and said group of gates, and said amplitude analyzer.

2. A coherent analyzer as claimed in claim 1, said amplitude analyzer comprising transistors equal in number to the number of all of said integrating networks, the bases of said transistors being connected to the outputs of said integrating networks and the emitters of said transistors being electrically connected to a common resistor, and a phase summator having inputs connected to the collectors of said transistors.

3. A coherent analyzer as claimed in claim 2, each of said transistors of said amplitude analyzer being provided with an individual resistor connected between the emitter of said transistor and said common resistor.

* * * * *